(12) United States Patent
Heil

(10) Patent No.: US 10,464,264 B2
(45) Date of Patent: Nov. 5, 2019

(54) MANDREL WHEEL FOR PRODUCING PACKAGES

(71) Applicants: SIG Technology AG, Neuhausen am Rheinfall (CH); Andrea Heil, Moenchengladbach (DE)

(72) Inventor: Michael Heil, Moenchengladbach (DE)

(73) Assignee: SIG Technology AG, Neuhausen am Rheinfall (CH)

( * ) Notice: Subject to any disclaimer, the term of this patent is extended or adjusted under 35 U.S.C. 154(b) by 0 days.

(21) Appl. No.: 15/558,642

(22) PCT Filed: Feb. 20, 2016

(86) PCT No.: PCT/EP2016/053614
§ 371 (c)(1),
(2) Date: Sep. 15, 2017

(87) PCT Pub. No.: WO2016/146342
PCT Pub. Date: Sep. 22, 2016

(65) Prior Publication Data
US 2018/0071996 A1  Mar. 15, 2018

(30) Foreign Application Priority Data
Mar. 19, 2015 (DE) .......................... 10 2015 104 102

(51) Int. Cl.
*B29C 65/00* (2006.01)
*B31B 50/02* (2017.01)
(Continued)

(52) U.S. Cl.
CPC .......... *B29C 66/8181* (2013.01); *B29C 65/02* (2013.01); *B29C 66/43* (2013.01);
(Continued)

(58) Field of Classification Search
CPC ....... B31B 50/30; B31B 50/32; B31B 50/322; B31B 50/324; B31B 50/326;
(Continued)

(56) References Cited

U.S. PATENT DOCUMENTS 3,207,049 A * 9/1965 Monroe .............. B29C 65/7882
156/497
3,303,761 A   2/1967 Monroe et al.
(Continued)

FOREIGN PATENT DOCUMENTS

CN      1717309 A    1/2006
CN    103492272 A    1/2014
(Continued)

*Primary Examiner* — William P Bell
(74) *Attorney, Agent, or Firm* — The Webb Law Firm

(57) ABSTRACT

A mandrel wheel for producing packages is illustrated and described, including: a mandrel wheel shaft having a central axis, a plurality of mandrels attached to the mandrel wheel shaft, an inflow for a coolant and an outflow for the coolant. The mandrels form at least one mandrel group, the mandrels of which are arranged in a plane perpendicular to the central axis of the mandrel wheel shaft. Each mandrel has a hollow space for the coolant, which is connected to an inlet and to an outlet separate from it. At least one distribution element is provided, which connects all inlets of a mandrel group to the inflow and which connects all outlets of the same mandrel group to the outflow, so that the mandrels can be cooled more effectively.

16 Claims, 2 Drawing Sheets

(51) Int. Cl.
*B29C 65/02* (2006.01)
*B31B 50/64* (2017.01)

(52) U.S. Cl.
CPC .. *B29C 66/81811* (2013.01); *B29C 66/83417* (2013.01); *B29C 66/851* (2013.01); *B29C 66/0342* (2013.01); *B31B 50/024* (2017.08); *B31B 50/649* (2017.08)

(58) Field of Classification Search
CPC ..... B31B 50/024; B31B 50/022; B31B 50/28; B65B 3/025; B65B 5/024; B65B 1/02; B65B 3/02; B65B 3/022; B65B 3/027
See application file for complete search history.

(56) References Cited

U.S. PATENT DOCUMENTS

| | | | |
|---|---|---|---|
| 3,566,762 A | 3/1971 | Vadas et al. | |
| 3,619,979 A | 11/1971 | Martensson et al. | |
| 4,986,058 A | 1/1991 | Carlsson et al. | |
| 5,492,592 A | 2/1996 | Bergholtz et al. | |
| 2013/0269298 A1* | 10/2013 | Baltes | B65B 3/025 53/473 |

FOREIGN PATENT DOCUMENTS

| | | |
|---|---|---|
| DE | 1953727 | 5/1970 |
| DE | 10358750 A1 | 7/2005 |
| EP | 0589157 A1 | 7/1993 |
| EP | 1541331 A2 | 6/2005 |
| GB | 743520 | 1/1956 |
| JP | 62297140 A | 12/1987 |
| JP | 686926 U | 12/1994 |

\* cited by examiner

MANDREL WHEEL FOR PRODUCING PACKAGES

CROSS-REFERENCE TO RELATED APPLICATIONS

This application is the United States national phase of International Application No. PCT/EP2016/053614 filed Feb. 20, 2016, and claims priority to German Patent Application No. 10 2015 104 102.2 filed Mar. 19, 2015, the disclosures of which are hereby incorporated in their entirety by reference.

BACKGROUND OF THE INVENTION

Field of the Invention

The invention relates to a mandrel wheel for producing packages, comprising: a mandrel wheel shaft having a central axis, a plurality of mandrels attached to the mandrel wheel shaft, an inflow for a coolant and an outflow for the coolant, wherein the mandrels form at least one mandrel group, the mandrels of which are arranged in a plane perpendicular to the central axis of the mandrel wheel shaft, and wherein each mandrel has a hollow space for the coolant, which is connected to an inlet and to an outlet separate from it.

Description of Related Art

Packages can be produced in different ways and from all kinds of materials. A common way of producing them is to make a blank from the packaging material, from which by folding and other steps a package sleeve is initially formed and finally a package is formed. This production method has, amongst other things, the advantage the blanks are very flat and hence can be stacked saving space. In this way, the blanks or package sleeves can be produced at another place than where the package sleeves are folded and filled. Composite materials, for example a composite consisting of a plurality of thin layers of paper, cardboard, plastic or metal, in particular aluminium, are often used as the material. Such packages are widely prevalent particularly in the food industry.

Numerous apparatuses and methods are known in the field of packaging technology, by means of which package sleeves flatly folded together can be unfolded, closed on one side, filled with contents and then completely closed.

Closing the package sleeves presents a special challenge because the package sleeves must be reliably sealed by means of this closing process and must withstand subsequent transport and other stresses and strains. The closing process often takes place in a plurality of steps: Firstly, the package sleeve is heated ("activated") in the area to be closed. Then, the opposite sides of the package sleeve are pressed together ("compressed") in the area to be closed. The cohesion between the areas pressed together is, for example, obtained by providing an inner plastic layer which becomes viscous during heating and hence forms an adhesive during the subsequent compression. This process is also called "sealing".

So-called "mandrel wheels" are often used to process, in particular to close the underside of the package sleeves, onto the radially protruding mandrels of which the still unfilled package sleeves are pushed. The cross-section of the mandrels approximately corresponds to the cross-section of the packages to be produced, so that the package sleeves already occupy the required cross-sectional form when they are pushed onto the mandrels.

While the package sleeve is on the mandrel, processing of the package sleeve occurs cyclically in the area of the protruding end of the mandrel. On the one hand, this has the advantage that the package sleeves by a rotation of the mandrel wheel consecutively can be processed by different tools. For example, in a first mandrel position heating can take place and following that in a second mandrel position compression can take place. A further advantage of processing package sleeves on a mandrel wheel is that the shape of the protruding ends of the mandrels can be adapted to the shape of the underside of the packages to be produced, so that the ends of the mandrels can serve as supports during compression.

Mandrel wheels for producing packages are, for example, known from DE 103 58 750 A, EP 0 589 157 A1, DE 19 53 727 A, U.S. Pat. Nos. 3,207,049 A and 3,303,761 A.

A challenge with the use of mandrel wheels lies in the high thermal loads on the mandrels which impact on them due to heat radiation (e.g. by heating devices) or pressure (e.g. by pressing devices). In the previously mentioned documents, therefore, different attempts are described for making the mandrels hollow and cooling them by means of a coolant.

The solutions described have, however, proved to be disadvantageous. One disadvantage of some solutions is that there is no continuous separation of the supply and discharge of the coolant, which results in a mixing of "fresh" (i.e. cold) coolant and already used (i.e. "warmer") coolant. A disadvantage of other solutions is that not every mandrel is provided with "fresh" coolant, but rather that coolant flows through some mandrels which has already previously flowed through another mandrel and has already warmed up ("connection in series"). Both solutions lead to a reduced cooling capacity and hence to a limitation in the rate at which package sleeves can be processed on the mandrel wheel. The disadvantages are, amongst other things, accounted for by the fact that connecting each mandrel to a separate supply and discharge line for the coolant has proved to be complex in terms of design due to the pivot-mounted arrangement of the mandrel wheels. Setting up an effective cooling device in the case of mandrel wheels with a plurality of mandrel groups is particularly complex.

SUMMARY OF THE INVENTION

Therefore, the invention is based on an object of developing and further refining a device described at the outset and previously explained in more detail in such a way that the mandrels are cooled in an improved manner. This object is achieved with a mandrel wheel by means of at least one distribution element which connects all inlets of a mandrel group to the inflow and which connects all outlets of the same mandrel group to the outflow.

The mandrel wheel according to the invention for producing packages is firstly characterised by a mandrel wheel shaft having a central axis. The mandrel wheel shaft is preferably cylindrically formed and the central axis runs in the longitudinal direction—i.e. in the axial direction—centrally straight through the mandrel wheel shaft. The mandrel wheel shaft can be produced from metal, for example from steel, in particular from a chrome-nickel alloy (CrNi). The mandrel wheel also comprises a plurality of mandrels attached to the mandrel wheel shaft. Attaching the mandrels to the mandrel wheel shaft serves the purpose of also rotating the mandrels about the central axis of the mandrel wheel shaft when the mandrel wheel shaft is rotated about its central axis. At the same time, the attached mandrels can be detachable, so that they can be replaced. The cross-sectional area of the mandrels can be rectangular, in particular square, in shape. Furthermore, the mandrel wheel comprises an inflow and an outflow for a coolant. The inflow and the outflow are formed separately, in order to prevent inflowing and outflowing coolant from mixing. The mandrels attached to the mandrel wheel form at least one mandrel group, the mandrels of which are arranged in one plane perpendicular to the central axis of the mandrel wheel shaft. The arrangement in one plane serves the purpose such that by a rotation of the mandrel wheel shaft consecutively the mandrels of the same mandrel group can be brought into the same positions, so that the package sleeves can be processed by different fixed tools there. Finally, each mandrel has a hollow space for the coolant, this hollow space being connected to an inlet and to an outlet separate from it. The separation of the inlet and the outlet of the mandrels—like the separation of the inflow and the outflow of the mandrel wheel—serves the purpose of preventing inflowing and outflowing coolant from mixing.

The mandrel wheel according to the invention is supplemented by at least one distribution element which connects all inlets of a mandrel group to the inflow and which connects all outlets of the same mandrel group to the outflow. Therefore, the distribution element produces a connection, in particular a direct connection, between each inlet of a mandrel group and the inflow of the mandrel wheel. The distribution element likewise produces a connection, in particular a direct connection, between each outlet of a mandrel group and the outflow of the mandrel wheel. Preferably, the connection between the inlets and the inflow is continuously separate from the connection between the outlets and the outflow. Thus, the distribution element ensures that all mandrels of a mandrel group are supplied with "fresh" coolant from the inflow of the mandrel wheel, that is to say, with a coolant which has not already been used beforehand for cooling another mandrel of the same or of another mandrel group. The distribution element also ensures that the coolant is conveyed out of all mandrels of a mandrel group to the outflow of the mandrel wheel without it being used on the way there for cooling further mandrels of the same or of another mandrel group. Therefore, the distribution element results in the mandrels being cooled considerably more efficiently. A greater cooling capacity can be achieved with the same flow rate of coolant or the same cooling capacity can be achieved with a lower flow rate of coolant. A further advantage of the use of at least one separate distribution element is that the distribution element can be retrofitted or replaced and can be adapted to the number and position of the mandrels and mandrel groups of a mandrel wheel. The distribution element can be produced from plastic, for example from a thermoplastic plastic, such as POM (polyoxymethylene). Plastic has the advantage that it can be formed into particularly variable shapes.

According to one embodiment of the mandrel wheel, provision is made for the mandrels to form at least two mandrel groups, the mandrels of which are respectively arranged in a plane perpendicular to the central axis of the mandrel wheel shaft. The production output of the mandrel wheel can be increased by two or more mandrel groups in different planes because a plurality of production lines of package sleeves can be processed at the same time. Preferably, a plurality of distribution elements are also provided in the case of mandrel wheels with a plurality of mandrel groups, it being possible for these distribution elements to be strung together in a line or slotted together, for example. With a corresponding design of the distribution elements, it is also possible in the case of a plurality of mandrel groups for all mandrels to be provided with "fresh" coolant from the inflow of the mandrel wheel, that is to say, with a coolant which has not already been used beforehand for cooling another mandrel of the same or of another mandrel group.

A further embodiment of the mandrel wheel makes provision for the mandrel wheel shaft to be a hollow shaft. The design of the mandrel wheel shaft as a hollow shaft firstly has the advantage of a lower mass which in the case of cyclical operation of the mandrel wheel results in less energy consumption. A further advantage of the hollow construction is that the interior of the mandrel wheel shaft can be used for supplying the mandrels with the coolant.

For this embodiment of the mandrel wheel, it is further proposed that the distribution element is arranged in the mandrel wheel shaft. Arranging the distribution element in the mandrel wheel shaft, as opposed to arranging it outside the mandrel wheel shaft, has the advantage that the construction particularly saves on space. In addition, by means of the central arrangement inside the mandrel wheel shaft, a symmetrical construction can be obtained, as a result of which the coolant has to cover the same flow path distances for cooling all mandrels of a mandrel group. This enables uniform cooling of all mandrels to be carried out, whereby variations in quality when processing the package sleeves can be prevented. A further advantage is that when the distribution element is arranged inside the mandrel wheel shaft, it is protected from mechanical and thermal loads.

In a further embodiment of the mandrel wheel, provision is made for the distribution element to have at least one support section, the outer diameter of which approximately corresponds to the inner diameter of the mandrel wheel shaft. The distribution element can be precisely positioned in the mandrel wheel shaft by means of the support section ("distributor head"), so that the distribution element can only be moved in the axial direction (i.e. along the central axis of the mandrel wheel shaft) and/or turned, while a movement in the radial direction (i.e. transverse to the central axis of the mandrel wheel shaft) is impossible. Preferably, a clearance fit or transition fit is provided between the support section and the inner wall of the mandrel wheel shaft. The distribution element can have a seal in the area of the support section, in order to prevent the coolant from flowing through between the support section and the inner wall of the mandrel wheel shaft.

According to a further embodiment of the mandrel wheel, the distribution element can have an axially running inner channel. The inner channel can be used either for supplying or alternatively for discharging the coolant. Preferably, the inner channel extends in the axial direction through the entire length of the distribution element. In this way, by stringing a plurality of distribution elements together in a line an inner channel can be formed which passes through a plurality of distribution elements. The inner channel can, for example, be cylindrically formed and can have any diameter adapted to the flow volume.

For this embodiment, it is further proposed that the distribution element has at least one distribution channel branching off from the inner channel and running radially. The distribution channels branch off from the inner channel, so that through the distribution channels a connection can be established between the inner channel and the individual mandrels of a mandrel group. Preferably, the number and the position of the distribution channels correspond to the number and the position of the mandrels assigned to them. Preferably, the distribution channels are distributed at even intervals over the circumference of the distribution element. Preferably, the distribution element has at least four, in particular at least six, distribution channels.

A further embodiment of the mandrel wheel makes provision for the distribution element to have at least one axially running outer channel. Like the inner channel, the outer channel can also be used either for supplying or alternatively for discharging the coolant. Preferably, the outer channel is continuously separate from the inner channel, in order to prevent inflowing and outflowing coolant from mixing. Since both the inner channel and the outer channel run axially, the inner channel and the outer channel are arranged concentrically.

For this embodiment, it is further proposed that the outer channel is at least in sections formed as a circumferential ledge, the outer diameter of which is less than the inner diameter of the mandrel wheel shaft. By means of this embodiment, the outer channel is delimited on one side by the inner wall of the mandrel wheel shaft. Due to the fully circumferential design of the outer channel, a single outer channel is sufficient to establish a connection to all mandrels of a mandrel group. Alternatively to this, a separate outer channel can be provided in the distribution element for each mandrel. In each case, the at least one outer channel should be designed and arranged such that it can accept the coolant exiting from the mandrels and convey it to the outflow.

With regard to the outer channel, provision can further be made for the outer channel to be at least in sections formed as an axial bore. In order to ensure that the coolant is reliably discharged even when a plurality of distribution elements are used strung together in a line, provision can be made for the outer channels to be at least in sections, in particular in the area of the support section, formed as axial bores. The axial bores are preferably arranged between the distribution channels also arranged in the support section, in order to prevent fresh coolant and already heated coolant from mixing.

In a further embodiment of the mandrel wheel, it is proposed that the length of the distribution element corresponds to the distance between the planes of two adjacent mandrel groups. In this way, each distribution element can be individually adapted to the respective mandrel group and in particular to the position of the inlets and outlets of this mandrel group. In the case of mandrel wheels with two or more mandrel groups, a plurality of distribution elements can be inserted one after the other into the hollow mandrel wheel shaft and together form a continuous supply line (e.g. through the inner channels) or a continuous discharge line (e.g. through the outer channels) for the coolant.

According to another embodiment of the mandrel wheel, provision is made for the hollow space for the coolant to be formed by two cooling channels connected to one another. By forming the hollow space from two cooling channels, the coolant can firstly be conveyed through the first cooling channel from the mandrel wheel shaft right through the entire mandrel to the protruding end of the mandrel ("mandrel plate"), absorb the heat there and then conveyed through the second cooling channel back into the mandrel wheel shaft. Therefore, by means of two separate cooling channels per mandrel, inflowing and outflowing coolant can be separated, which results in the mandrels being cooled more efficiently.

A further embodiment of the mandrel wheel makes provision for the inflow for the coolant and the outflow for the coolant to be arranged at opposite ends of the mandrel wheel shaft. An extensive spatial separation of inflowing (cold) coolant and outflowing (warmer) coolant is accomplished by means of this embodiment. In this way, the inflowing coolant being heated by the outflowing coolant is extensively prevented and, compared to a one-sided arrangement of inflow and outflow on the same side of the mandrel wheel shaft, cooling can be made more efficient.

In a further embodiment of the mandrel wheel, provision is made for the mandrel wheel to comprise at least two, in particular at least four or at least six, mandrel groups. A further embodiment of the invention makes provision for each mandrel group to comprise at least four mandrels, in particular at least six mandrels. A plurality of lines of package sleeves can be processed at the same time by means of a larger number of mandrel groups. A larger number of processing steps can be carried out on the package sleeves by means of a larger number of mandrels per mandrel group.

BRIEF DESCRIPTION OF THE DRAWINGS

The invention is explained in more detail below with the aid of the figures illustrating only one preferred exemplary embodiment.

DETAILED DESCRIPTION OF THE INVENTION

Figure 1:
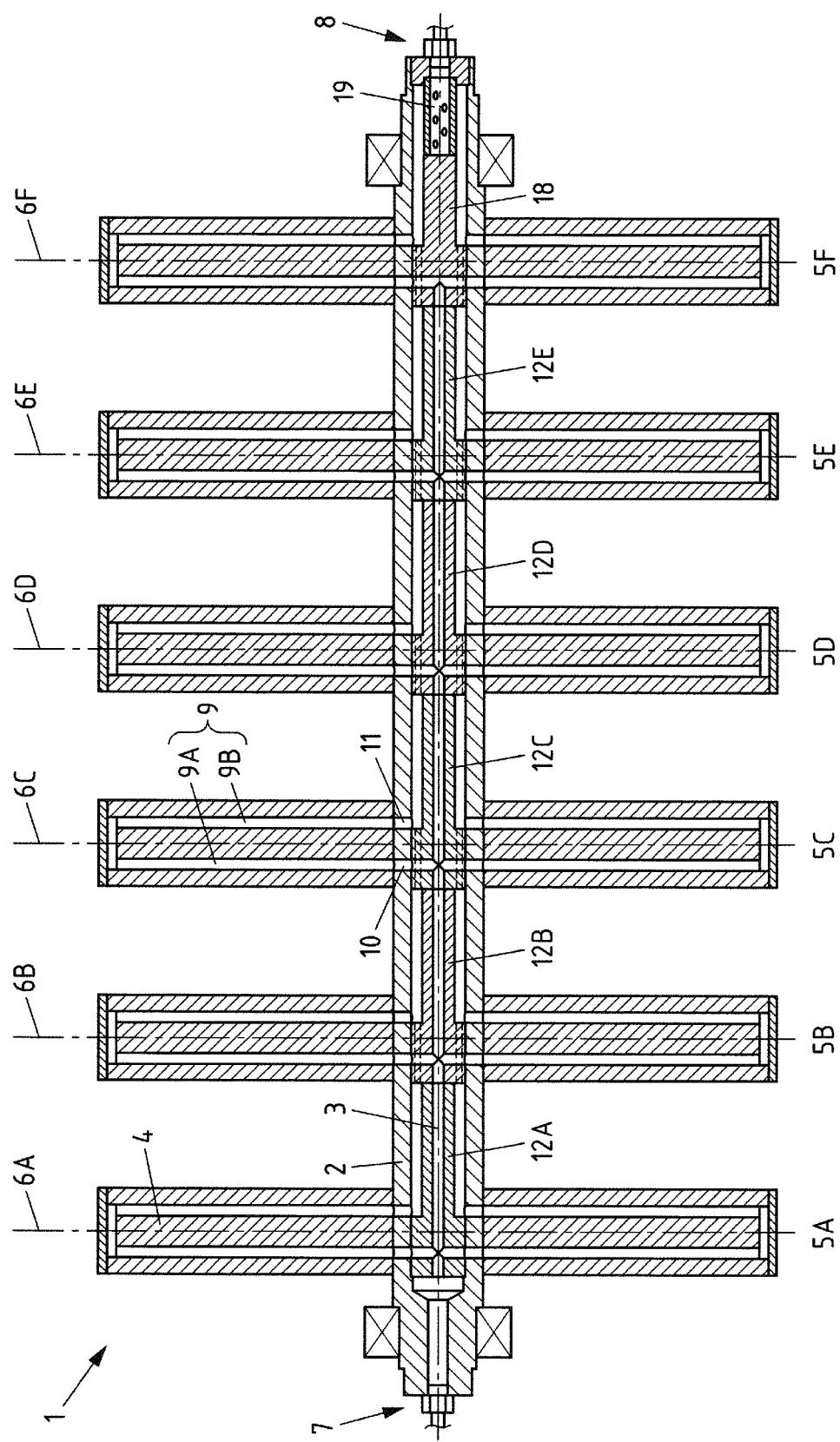
FIG. 1 shows a mandrel wheel according to the invention for producing packages, in a side view.

FIG. 1 shows a mandrel wheel 1 according to the invention for producing packages, in a side view. The mandrel wheel 1 comprises a mandrel wheel shaft 2 which runs along a centrally located central axis 3. The mandrel wheel shaft 2 can be formed as hollow shaft. A plurality of mandrels 4 are attached to the mandrel wheel shaft 2. The mandrels 4 form mandrel groups 5A to 5F, the mandrels 4 of which are respectively arranged in a plane 6A to 6F perpendicular to the central axis 3 of the mandrel wheel shaft 2. In the case of the mandrel wheel 1 shown and in this respect preferred in FIG. 1, each mandrel group 5A to 5F comprises four mandrels 4, so that there are twenty four mandrels 4 in total. The mandrels 4 of a mandrel group 5A to 5F are preferably distributed evenly over the circumference of the mandrel wheel shaft, so that in the case of a configuration with four mandrels 4 per mandrel group 5A to 5F a mandrel gap of 90° occurs.

The mandrel wheel 1 shown in FIG. 1 also comprises an inflow 7 for a coolant and an outflow 8 for a coolant. The inflow 7 and the outflow 8 are arranged at opposite ends of the mandrel wheel 1. Each mandrel 4 has a hollow space 9 for the coolant, wherein the hollow space can be formed by two cooling channels 9A, 9B connected to one another. Each hollow space 9 is connected to an inlet 10 and an outlet 11 separate from it. In addition, the mandrel wheel 1 comprises a plurality of distribution elements 12A to 12E. The distribution elements 12A to 12E connect the inlets 10 of a mandrel group 5A to 5F to the inflow 7 and the outlets 11 of the same mandrel group 5A to 5F to the outflow 8. In the case of the mandrel wheel 1 shown and in this respect preferred in FIG. 1, the length of the distribution elements 12A to 12E corresponds to the distance between the planes 6A to 6F of two adjacent mandrel groups 5A to 5F. In this way, a different number of distribution elements 12A to 12E can be put together, whereby an adjustment to the number of mandrel groups 5A to 5F is possible.

Figure 2:
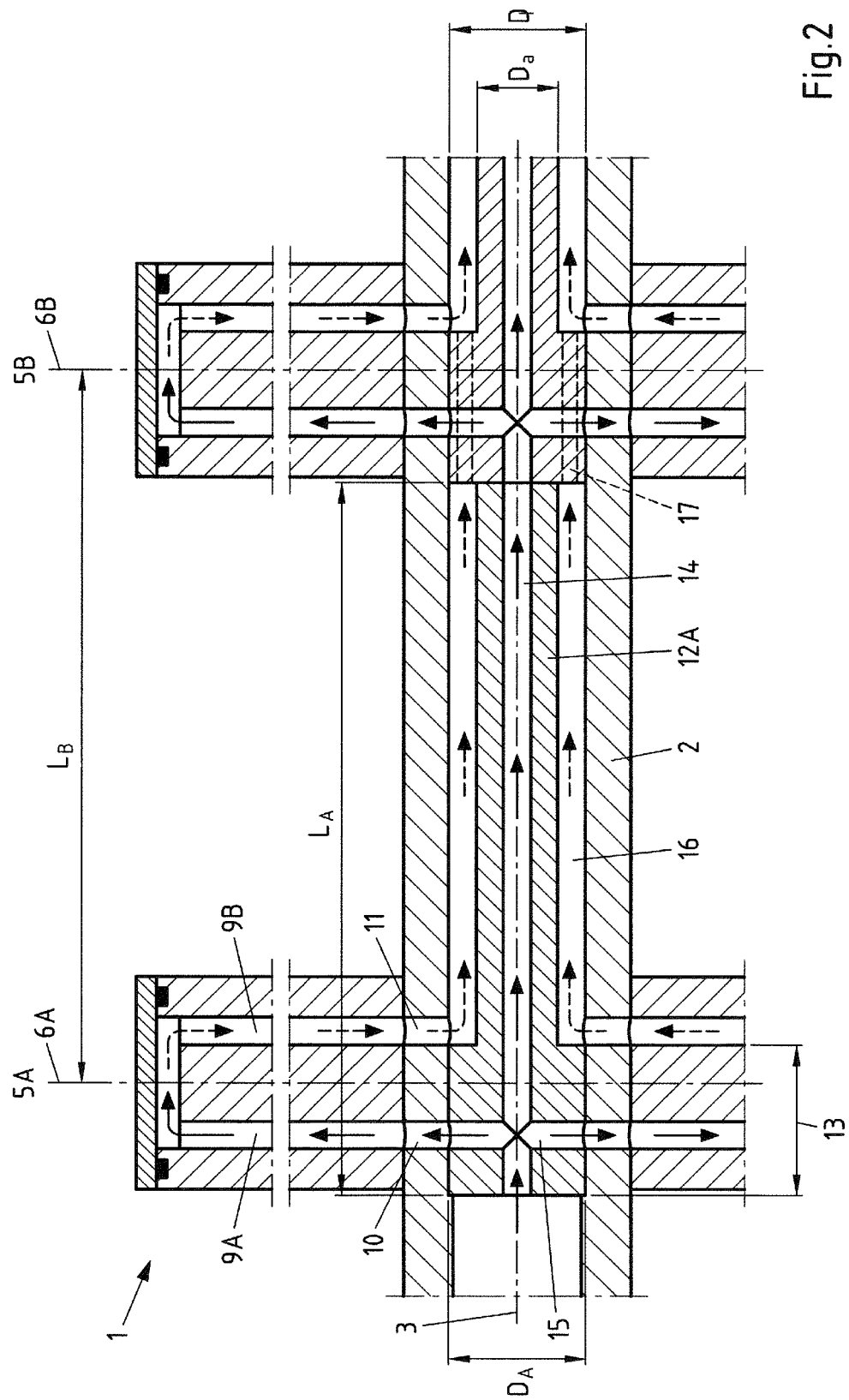
FIG. 2 shows an enlarged view of the mandrel wheel from FIG. 1.

An enlarged view of the mandrel wheel 1 from FIG. 1 is illustrated in FIG. 2. In the enlarged view, in particular the structure of the distribution element 12A and its arrangement in the mandrel wheel shaft 2 can be identified. The rest of the distribution elements 12B to 12E—not illustrated in FIG. 2—have an identical structure. The distribution element 12A has a support section 13, the outer diameter $D_A$ of which approximately corresponds to the inner diameter $D_I$ of the mandrel wheel shaft. The distribution element 12A can be precisely positioned in the mandrel wheel shaft 2 using such a design of the support section 13, so that the distribution element 12A can only be moved in the axial direction (i.e. along the central axis 3) or turned, while a movement in the radial direction (i.e. transverse to the central axis 3) is impossible.

The distribution element 12A has an axially running inner channel 14 which extends right through the entire distribution element 12A. A plurality of radially running distribution channels 15 branch off from this inner channel 14. Preferably, the number and the position of the distribution channels 15 correspond to the number and the position of the mandrels 4 assigned to the distribution element 12A. As a result, the distribution element 12A illustrated in FIG. 2 has four distribution channels 15 which are distributed at even intervals of 90° over the circumference of the distribution element 12A. The distribution channels 15 are preferably arranged in the area of the support section 13, so that the outer ends of the distribution channels 15 lead to the inner surface of the hollow mandrel wheel shaft 2 and there the coolant can enter the inlets 10 of the mandrels 4.

In addition to the inner channel 14, the distribution element 12A also has at least one axially running outer channel 16. A single outer channel 16 can be provided, in which in this case it is preferred if the outer channel 16 is at least in sections formed as a circumferential ledge, the outer diameter $D_a$ of which is less than the inner diameter $D_I$ of the mandrel wheel shaft 2. Alternatively to this, a separate outer channel 16 can also be provided for each mandrel 4 in the distribution element 12A. In each case, the at least one outer channel 16 must be designed and arranged in such a way that it can accept coolant exiting from the outlets 11 of the mandrels 4 and can convey it to the outflow 8. In order to ensure that the coolant is reliably discharged, even when a plurality of distribution elements 12A to 12E strung together in a line are used, provision is made for the outer channels 16 to be formed as axial bores 17 in the area of the support section 13. The axial bores 17 are preferably arranged between the distribution channels 15 also arranged in the support section 13, in order to prevent fresh coolant and already heated coolant from mixing. In addition, the first distribution element 12A—different from the other distribution elements 12B to 12E—should not have any axial bores 17, in order to prevent a backflow of already heated coolant.

In FIG. 2, it can also be identified that the length $L_A$ of the distribution element 12A corresponds to the distance $L_B$ between the planes 6A, 6B of two adjacent mandrel groups 5A, 5B. In this way, the distribution element 12A can be adapted individually to the respective mandrel group 5A and in particular to the position of the inlets 10 and outlets 11 of this mandrel group 5A. In the case of mandrel wheels 1 with more than two mandrel groups 5A to 5F, a plurality of distribution elements 12A to 12E can be inserted one after the other into the hollow mandrel wheel shaft 2 and together form a continuous supply line (through the inner channels 14) or a continuous discharge line (through the outer channels 16/axial bores 17) for the coolant. Finally, the mandrel wheel 1 has an end piece 18 (only illustrated in FIG. 1) which seals off the inner channel 11 of the last distribution element 12E and collects the coolant flowing through the outer channel 16 of the last distribution element 12E in a centrally located outflow channel 19 and conveys it from there to the outflow 8 of the mandrel wheel 1.

LIST OF REFERENCE SYMBOLS

1: Mandrel wheel
2: Mandrel wheel shaft
3: Central axis
4: Mandrel
5A-5F: Mandrel group
6A-6F: Plane
7: Inflow (for coolant)
8: Outflow (for coolant)
9: Hollow space
9A, 9B: Cooling channel
10: Inlet
11: Outlet
12A-12E: Distribution element
13: Support section
14: Inner channel
15: Distribution channel
16: Outer channel
17: Axial bore
18: End piece
19: Outflow channel
$D_A$: Outer diameter (in the area of the support section 13)
$D_a$: Outer diameter (in the area of the outer channel 16)
$D_I$: Inner diameter (of the mandrel wheel shaft 2)
$L_A$: Length (of the distribution element 12)
$L_B$: Distance (between the planes 6)

The invention claimed is:

1. A mandrel wheel for producing packages comprising:
   a mandrel wheel shaft having a central axis,
   a plurality of mandrels attached to the mandrel wheel shaft,
   an inflow for a coolant,
   an outflow for the coolant, and
   at least one separate distribution element, which connects all inlets of a mandrel group to the inflow and which connects all outlets of the same mandrel group to the outflow,
   wherein the mandrels form at least two mandrel groups, the mandrels of which are respectively arranged in a plane perpendicular to the central axis of the mandrel wheel shaft,
   wherein each mandrel has a hollow space for the coolant, which is connected to an inlet and to an outlet separate from it,
   wherein the mandrel wheel is a hollow shaft, and
   wherein the at least one separate distribution element is arranged in the mandrel wheel shaft, and
   wherein a separate distribution elements is provided for each mandrel group.

2. The mandrel wheel according to claim 1,
   wherein the at least one separate distribution element has at least one support section, an outer diameter of which approximately corresponds to an inner diameter of the mandrel wheel shaft.

3. The mandrel wheel according to claim 1,
   wherein the at least one separate distribution element has an axially running inner channel.

4. The mandrel wheel according to claim 3,
wherein the at least one separate distribution element has at least one distribution channel branching off from the inner channel and running radially.

5. The mandrel wheel according to claim 1,
wherein the at least one separate distribution element has at least one axially running outer channel.

6. The mandrel wheel according to claim 5,
wherein the outer channel is at least in sections formed as a circumferential ledge, an outer diameter of which is less than an inner diameter of the mandrel wheel shaft.

7. The mandrel wheel according to claim 6,
wherein the outer channel is at least in sections formed as an axial bore.

8. The mandrel wheel according to claim 5,
wherein the outer channel is at least in sections formed as an axial bore.

9. The mandrel wheel according to claim 1,
wherein a length of the at least one separate distribution element corresponds to a distance between the planes of two adjacent mandrel groups.

10. The mandrel wheel according to claim 1,
wherein the hollow space for the coolant is formed by two cooling channels connected to one another.

11. The mandrel wheel according to claim 1,
wherein the inflow for the coolant and the outflow for the coolant are arranged at opposite ends of the mandrel wheel shaft.

12. The mandrel wheel according to claim 1,
wherein the mandrel wheel comprises at least two mandrel groups.

13. The mandrel wheel according to claim 1,
wherein each mandrel group comprises at least four mandrels.

14. The mandrel wheel according to claim 1, wherein the mandrel wheel comprises at least four mandrel groups.

15. The mandrel wheel according to claim 1, wherein the mandrel wheel comprises at least six mandrel groups.

16. The mandrel wheel according to claim 1, wherein each mandrel group comprises at least six mandrels.

* * * * *

UNITED STATES PATENT AND TRADEMARK OFFICE
CERTIFICATE OF CORRECTION

PATENT NO. : 10,464,264 B2
APPLICATION NO. : 15/558642
DATED : November 5, 2019
INVENTOR(S) : Michael Heil Page 1 of 1

It is certified that error appears in the above-identified patent and that said Letters Patent is hereby corrected as shown below:

In the Claims

Column 8, Line 58, Claim 1, delete "elements" and insert -- element --

Signed and Sealed this
Eighteenth Day of February, 2020

Andrei Iancu
*Director of the United States Patent and Trademark Office*